2,894,035
PREPARATION OF M-CHLOROANILINE

Harold K. Latourette, South Charleston, W. Va., Oscar H. Johnson, New Canaan, Conn., and John W. Getz, St. Albans, W. Va., assignors to Food Machinery and Chemical Corporation, New York, N.Y., a corporation of Delaware No Drawing. Application July 27, 1953
Serial No. 370,632

6 Claims. (Cl. 260—580)

This invention relates to a novel process for the preparation of m-chloroaniline from m-chloronitrobenzene, and particularly to such a process where the m-chloronitrobenzene is present in a mixture of isomers and other impurities.

The compound m-chloroaniline has always been prepared from m-chloronitrobenzene. It was first prepared in 1875, by reducing m-chloronitrobenzene with tin and hydrochloric acid. Other metals, such as iron, may be used in this "nascent" hydrogen method of reduction. The reduction with hydrogen may also be effected in the presence of catalysts, in either the vapor or liquid phases. Other workers have effected reduction of pure m-chloronitrobenzene with sodium sulfide, sodium disulfide and sodium trisulfide.

The m-chloronitrobenzene used as a starting material is normally prepared by one of two general methods. The first and most commonly used reaction involves catalytic chlorination of nitrobenzene, yielding a mixture of products. This mixture contains unaltered nitrobenzene, meta-, ortho- and p-chloronitrobenzenes and dichloronitrobenzenes. To obtain pure m-chloronitrobenzene from this mixture, as a starting material for the subsequent preparation of m-chloroaniline, requires a tedious and difficult rectification and fractional crystallization procedure. The other method of obtaining m-chloronitrobenzene involves the decomposition of a diazonium salt obtained from m-nitroaniline (Sandmeyer reaction). This method yields a pure product, uncontaminated by isomers, but is uneconomical for ordinary commercial use.

Therefore, a commercial method for the preparation of a pure m-chloroaniline from impure m-chloronitrobenzene is needed, which avoids the various disadvantages of the prior art methods.

It is an object of this invention to provide an improved method for the preparation of pure m-chloroaniline.

Another object is to provide a method for the preparation of pure m-chloroaniline from impure m-chloronitrobenzene.

Other objects will be obvious to those skilled in the art from a consideration of the disclosures contained herein.

It has been found that pure m-chloroaniline can be prepared from impure m-chloronitrobenzene by reaction with an alkali metal sulfide, preferably sodium hydrosulfide.

As indicated above, the m-chloronitrobenzene obtained by the catalytic chlorination of nitrobenzene is an impure mixture. The proportion of the isomers obtained is usually a fairly constant ratio of meta:ortho:para= 15:3:1, together with some unreacted nitrobenzene and some dichloronitrobenzene. Efficient rectification separates most of the nitrobenzene and dichloronitrobenzene, and part of the ortho isomer, but none of the para isomer, yielding as best a product containing about 92% of the meta isomer. Reduction of the crude or rectified mixture by conventional techniques yields a mixture of anilines which is no easier to separate than was the mixture of nitro compounds.

It has been discovered that it is possible to combine the known reactions of alkali metal sulfides with ortho or para isomers (yielding sulfides and mercaptans) and the reaction with pure m-chloronitrobenzene (yielding m-chloroaniline) so as to obtain a resultant mixture of products from which pure m-chloroaniline may be readily separated. Thus, the mercaptans are soluble in the aqueous solution and may be separated by decantation. The m-chloroaniline is readily separable from sulfides and other non-volatile contaminants by distillation, yielding a product of greater than 98% purity. The advantages of this procedure are readily apparent, when one considers that in one operation the reduction has been effected and at the same time the unwanted isomers have been converted to easily separable products.

While any alkali sulfide or polysulfide may be used for this process, we have found that sodium hydrosulfide possesses certain advantages, as may be illustrated by the following equations (wherein R is m-$ClC_6H_4$):

(1) $4RNO_2 + 6NaHS + H_2O \rightarrow 4RNH_2 + 3Na_2S_2O_3$ (2) $4RNO_2 + 6Na_2S + 7H_2O \rightarrow$
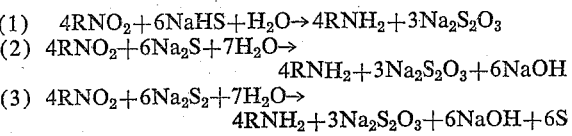
$4RNH_2 + 3Na_2S_2O_3 + 6NaOH$ (3) $4RNO_2 + 6Na_2S_2 + 7H_2O \rightarrow$
$4RNH_2 + 3Na_2S_2O_3 + 6NaOH + 6S$ In reactions 2 and 3, with sodium sulfide and disulfide respectively, the formation of sodium hydroxide causes the mixture to become increasingly alkaline which tends to decrease the reducing power and to increase the tendency toward bimolecular reduction, yielding 3,3'-dichloroazo- and azoxy-benzenes as byproducts. In addition, in reaction 3, the precipitation of sulfur complicates the separation of the m-chloroaniline.

In an effort to avoid the formation of sodium hydroxide while using sodium sulfide, others have added one mole of sodium bicarbonate per mole of sodium sulfide, obtaining a reaction as indicated in the folowing equation:

(4) $4RNO_2 + 6Na_2S + 6NaHCO_3 + H_2O \rightarrow$
$4RNH_2 + 3Na_2S_2O_3 + 6Na_2CO_3$ This expedient has the disadvantages of added cost of the bicarbonate and the limited solubility of the bicarbonate, requiring the use of a much larger reactor volume than is necessary with sodium hydrosulfide.

This invention should not be confused with the earlier, somewhat related work of others. Thus, this invention comprises the novel use of a single reagent to accomplish two known types of reaction, effecting a chemical reduction process and a separation process in a single operation. It is known that alkali sulfides react with certain nitro compounds to produce the corresponding amine. This reaction is most frequently used to selectively reduce one of the nitro groups in a polynitroaromatic compound, e.g. m-dinitrobenzene. When so used, the sulfide solution is added slowly to a solution or suspension of the dinitro compound so as to maintain an excess of the dinitro compound and thus avoid reduction of more than one nitro group.

On the other hand, alkali sulfides react in a different manner with ortho- and para-chloronitrobenzenes, causing nucleophilic displacement of the chlorine atom to form the corresponding sulfides, disulfides and mercaptans, e. g.:

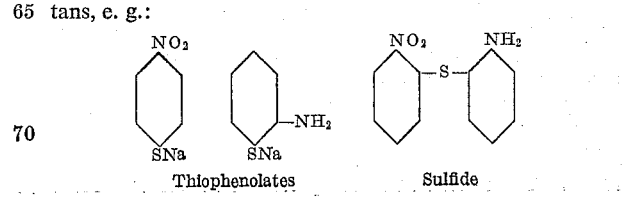

Thiophenolates      Sulfide

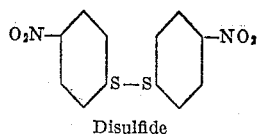

Disulfide

These reactions have been utilized in this invention to treat mixtures of the three chloronitrobenzene isomers, resulting in reduction of the meta isomer and conversion of the ortho- and para-isomers to compounds which may be readily separated from the m-chloroaniline. Thus, the sodium thiophenolates are soluble in water and may be separated by decantation. The sulfides and disulfides are relatively non-volatile, and so the more volatile m-chloroaniline may be separated from them by rectification. As an alternative method, m-chloroaniline may be separated by steam distillation from the thiophenolates and sulfides.

The process of the invention is not limited to mixtures of chloronitrobenzene isomers obtained in any particular method or partially purified by any particular procedure, but is applicable to any mixture of m-chloronitrobenzene with one or both of its isomers. The presence of other compounds, e.g. nitrobenzene and 2,5-dichloronitrobenzene, does not interfere with the use of the invention, since the corresponding amines are readily separable by rectification.

A preferred method of preparing m-chloronitrobenzene, from the standpoint of raw material efficiency, involves chlorination of nitrobenzene at 40° C. in the presence of 3% by weight of ferric chloride to a suitable extent of chlorination, for example, one mole of chlorine to one mole of nitrobenzene. The resulting mixture is rectified under vacuum to remove the nitrobenzene (about 10% of the mixture) and the dichloronitrobenzenes (about 15% of the mixture) together with part of the o-chloronitrobenzene. This may be done batchwise through one column, or continuously through two columns (nitrobenzene taken off the top of the first still, monochloronitrobenzene from the top of the second still). The monochloronitrobenzene cut may contain about 92% m-chloronitrobenzene, 3% p-chloronitrobenzene, 4% o-chloronitrobenzene, and 1% nitrobenzene.

This material may then be added to a well-agitated 20% sodium hydrosulfide solution maintained at its boiling point. An advantageous molar ratio of sodium hydrosulfide to nitro compound is 3.2:2 but other ratios may be used. The heat of reaction is removed by condensing vapors in a reflux condenser. When the reduction is complete, the organic layer is separated from the aqueous layer by decantation, and is then distilled. After a very small forerun, consisting largely of aniline, m-chloroaniline assaying about 99% (by freezing point or infrared analysis) is collected in about 92% efficiency, based on the m-chloronitrobenzene charged to the reducer.

The following examples serve to illustrate the method of the present invention, but are not to be construed as limiting the scope thereof.

*Example 1*

A 2 liter, three-necked, baffled flask was equipped with an electrically-heated addition funnel, an efficient mechanical stirrer, a reflux condenser, and a thermometer. It was heated with an electric heating mantle. A 20.0% solution of sodium hydrosulfide in water (1570 g., 5.60 moles) was placed in the flask and heated to reflux. The mantle was removed, m-chloronitrobenzene obtained by rectification of chlorinated nitrobenzene analyzed as follows by infrared analysis in weight percent: m-chloronitrobenzene, 92.2; nitrobenzene, 1.5; o-chloronitrobenzene, 3.5; and p-chloronitrobenzene, 3.3. This mixture (552 g., 3.55 moles total) was melted and introduced through the dropping funnel into the well-agitated sodium hydrosulfide solution at such a rate as to maintain a vigorous reflux. The addition was complete in 32 minutes. Heat was again applied, and the mixture was agitated under gentle reflux for four more hours. The hot mixture was poured into a separatory funnel where the lighter amine layer quickly separated and was removed.

This product (418.3 g.) was subjected to rectification under a pressure of 50.5 mm. The column, one inch in diameter, was filled to a depth of 19¾ in. with stainless steel Podbielniak Heli-Pak packing, 0.1" x 0.1" x 0.05". The reflux ratio was controlled by an intermittent magnetic condensate splitter. The reflux ratio was varied from 40:1 to 4:1. After an initial fraction consisting largely of water two organic fractions were collected. The first boiled at 108–138° C., the second at 138.0–138.5° C. The fractions, column holdup, and pot residue were analyzed by infrared spectroscopy. The over-all efficiency of conversion of m-chloronitrobenzene to m-chloroaniline was 91.9%. Of this, 87% was isolated in the second fraction which assayed (by freezing point) 98.5%. The conversion of ortho- and p-chloronitrobenzene to the corresponding amine was 12.7% and 5.4%, respectively.

*Example 2*

The equipment and reaction conditions in this example were the same as in Example 1. The m-chloronitrobenzene used was obtained directly from chlorination of nitrobenzene without rectification. It analyzed as follows (weight percent): nitrobenzene, 11.9; m-chloronitrobenzene, 64.7; o-chloronitrobenzene, 7.5; p-chloronitrobenzene, 3.8; 2,5-dichloronitrobenzene, 10.7. This material had been washed with water to remove ferric chloride and hydrogen chloride. This mixture (473 g., 2.993 moles total) was added to a 21.67% sodium hydrosulfide solution (1551 g., 6.02 moles). The rectification of the product after separation was carried out under a pressure of 49 mm. The first organic fraction, B.P. 101.3–137.3° C., analyzed 70% aniline. The second fraction boiled at 137.3–137.6° C. The overall efficiency of conversion of m-chloronitrobenzene to m-chloroaniline was 89.5%, of which 82% was isolated in the second fraction as 98.2% material. The over-all efficiencies of conversion of the other constituents to the corresponding amines (percent) were: nitrobenzene, 100; o-chloronitrobenzene, 1.0; p-chloronitrobenzene, 6.5; 2,5-dichloronitrobenzene, 45.6.

*Example 3*

The equipment and conditions were the same as in Example 1, except as indicated. A synthetic mixture of chloronitrobenzene was prepared, using pure constituents, of the following-composition (weight percent): m-chloronitrobenzene, 92.00; o-chloronitrobenzene, 4.00; p-chloronitrobenzene, 1.50; 2,5-dichloronitrobenzene, 2.50. This mixture (308.4 g., 1.800 moles of meta) was added to 810 g. (3.13 moles) to a 20.0% sodium hydrosulfide solution and treated in the usual manner. The rectification was carried out as in Example 1, except that the column was packed with ⅛ in. glass helices, and no organic forerun was collected. In the main fraction, 224.9 g. (1.740 moles) of m-chloroaniline, assaying by freezing point 98.6%, was collected for a meta efficiency of 93.7%.

*Example 4*

The equipment and conditions were the same as in Example 3, except as indicated. The m-chloronitrobenzene was obtained by rectification of the product of chlorination of nitrobenzene and analyzed by infrared as follows: m - chloronitrobenzene, 92.1%; o - chloronitrobenzene, 1.9%; p-chloronitrobenzene, 2.9%; nitrobenzene and 2,5-dichloronitrobenzene, 0.0%. A 20.0% sodium hydrosulfide solution (960 g., 3.48 moles) was placed in the flask and heated to 50° C. Thirty-five percent of the chloronitrobenzene mixture (342 g., 2.0 moles of meta) was introduced in one batch to the well-agitated mixture. The temperature rose in seven minutes to reflux, 107° C. The remainder of the chloronitrobenzene mixture was added as in Example 1. After rectification, the main fraction (217.2 g., 1.68 moles) of m-chloroaniline was collected, assaying by freezing point 98.6%. The meta efficiency was 84.0%.

*Example 5*

The equipment and conditions were the same as in Example 1 except as indicated. A 10.9% solution of sodium hydrosulfide in water (783 g., 1.55 moles) was placed in the flask and heated to reflux. m-Chloronitrobenzene (137.6 g., 0.873 mole) obtained by rectification of chlorinated nitrobenzene but not analyzed, was introduced to the hot sodium hydrosulfide solution. After the mixture had refluxed for 4.75 hours it was steam distilled through a continuous decanter in which the aqueous layer of the steam distillate was returned to the pot. The organic layer was separated and subjected to simple distillation yielding 98.1 g. of a product assaying 97.5% m-chloroaniline by infrared. If it is assumed that the starting material contained 90.0% m-chloronitrobenzene this corresponds to an efficiency of 95.5%.

The temperature of the reaction is advantageously maintained between 80° C. and the boiling temperature of the mixture, but some reaction proceeds at lower temperatures. The time required for the reaction is dependent upon other operating conditions, such as the temperature and the efficiency of agitation, but ordinarily about four hours are required after all of the nitro compound has been added. The concentration of the sulfide solution is preferably about 20%, but may be lower; higher concentrations lead to decreased yields, as shown by the following data:

*Table I*

| Sodium hydrosulfide concentration, weight percent | Reaction efficiency, percent |
| --- | --- |
| 10.1 | 95.0 |
| 10.9 | 95.5 |
| 11.2 | 92.7 |
| 13.0 | 90.6 |
| 18.3 | 89.6 |
| 20.0 | 93.7 |
| 23.0 | 86.2 |
| 31.0 | 55.8 |
| 40.3 | 66.3 |

Atmospheric pressure is normally used, but the reaction temperature and rate may be increased by using super-atmospheric pressure. Although water has been advantageously used as the reaction medium for the reaction, other media, such as alcohol, may be used.

The molar ratio of sulfide to nitro-compounds must be at least 3:2, from stoichiometric considerations, for a complete reaction, but an excess of sulfide may of course be used. The preferred ratio is 3.2:2. As indicated above, the preferred alkali sulfide reactant is sodium hydrosulfide, but the normal alkali and ammonium sulfides, disulfides and polysulfides may also be used. Also, a mixture of a sulfide and a suitable proton donor, e.g. sodium bicarbonate, may be used, since such a mixture reacts to yield sodium hydrosulfide. As used herein, the term "alkali sulfide" includes all of these substances.

It is to be noted that the chloronitrobenzene is added to the sulfide solution, rather than the reverse. This is a preferred method for practising the instant invention. The preferred rate of addition of the chloronitrobenzene mixture is such as to maintain a substantial rate of reaction, as evidenced by a vigorous refluxing of the reaction mixture.

The chloronitrobenzene may be a mixture such as is obtained in the usual chlorination process, or it may be a meta-enriched mixture obtained by any purification procedure. Regardless of the source, this invention affords a novel method for removing the usual isomeric and related impurities, and isolating pure m-chloroaniline.

The foregoing description is intended to be illustrative only, and it will be obvious to those skilled in the art that minor variations within the spirit of this invention may be made without departing from the scope of the appended claims.

That which is claimed as new is:

1. A process for preparing substantially pure meta-chloroaniline from crude metachloronitrobenzene containing substantial amounts of isomeric impurities which comprises heating an aqueous solution of sodium hydrosulfide with said crude mixture until the reaction is substantially complete, allowing the reaction mixture to stratify, and separating the thus formed organic liquid layer and distilling substantially pure meta-chloroaniline from the said organic liquid layer.

2. A process for preparing substantially pure meta-chloroaniline from crude meta-chloronitrobenzene containing a substantial amount of isomeric impurity which comprises heating an aqueous solution of sodium hydrosulfide with said crude mixture until the reaction is substantially complete, and recovering substantially pure meta-chloroaniline from the reaction mixture.

3. A process for preparing substantially pure meta-chloroaniline from crude meta-chloronitrobenzene containing a substantial amount of isomeric impurity which comprises heating an aqueous solution of sodium hydrosulfide with said crude mixture until the reaction is substantially complete, and recovering substantially pure meta-chloroaniline from the reaction mixture by distillation.

4. The process of claim 1 wherein the proportions of reactants are about 3.2 moles of hydrosulfide per 2 moles of chloronitrobenzene.

5. The process of claim 1 wherein the reaction is carried out at the boiling temperature of the reaction mixture.

6. The process of claim 1 wherein the hydrosulfide solution contains about 20% sodium hydrosulfide by weight.

References Cited in the file of this patent

UNITED STATES PATENTS

| 714,428 | Wirth | Nov. 25, 1902 |
| 1,074,545 | Flurscheim | Sept. 30, 1913 |
| 2,631,167 | Werner | Mar. 10, 1953 |

OTHER REFERENCES

Hodgson et al.: Journal Chem. Soc. (London) (1925), vol. 127, pp. 440–4.